US 7,782,357 B2

(12) United States Patent
Cutler (10) Patent No.: US 7,782,357 B2
(45) Date of Patent: Aug. 24, 2010

(54) MINIMIZING DEAD ZONES IN PANORAMIC IMAGES

(75) Inventor: Ross G. Cutler, Duval, WA (US)

(73) Assignee: Microsoft Corporation, Redmond, WA (US)

( * ) Notice: Subject to any disclaimer, the term of this patent is extended or adjusted under 35 U.S.C. 154(b) by 1059 days.

(21) Appl. No.: 11/026,466

(22) Filed: Dec. 30, 2004

(65) Prior Publication Data

US 2005/0151837 A1 Jul. 14, 2005

Related U.S. Application Data

(63) Continuation-in-part of application No. 10/608,363, filed on Jun. 26, 2003, now Pat. No. 7,298,392, which is a continuation-in-part of application No. 10/177,315, filed on Jun. 21, 2002, now Pat. No. 7,259,784.

(51) Int. Cl.
*H04N 7/00* (2006.01)
*G02B 13/06* (2006.01)

(52) U.S. Cl. .......................................... 348/36; 359/725

(58) Field of Classification Search ................... 352/69; 359/725; 348/14.08
See application file for complete search history.

(56) References Cited

U.S. PATENT DOCUMENTS

| 3,118,340 | A |   | 1/1964  | Iwerks et al. |
|-----------|---|---|---------|---------------|
| 3,698,803 | A | * | 10/1972 | Watanuki ...................... 352/69 |
| 4,626,893 | A |   | 12/1986 | Yamanaka ................... 348/176 |
| 5,504,524 | A |   | 4/1996  | Lu et al. .................... 348/223.1 |
| 5,539,483 | A |   | 7/1996  | Nalwa |
| 5,745,305 | A |   | 4/1998  | Nalwa |
| 5,790,183 | A | * | 8/1998  | Kerbyson ..................... 348/37 |
| 5,793,527 | A |   | 8/1998  | Nalwa |
| 5,990,934 | A |   | 11/1999 | Nalwa |
| 6,005,611 | A |   | 12/1999 | Gullichsen et al. |
| 6,043,837 | A |   | 3/2000  | Driscoll, Jr. et al. |
| 6,101,287 | A |   | 8/2000  | Corum et al. ............... 382/274 |

(Continued)

FOREIGN PATENT DOCUMENTS

JP    1996125835 A    5/1996

(Continued)

OTHER PUBLICATIONS

Charfi, M., A. Nyeck, A. Tosser, "Focusing Criterion", Electronic Letters, vol. 27, No. 14, pp. 1233-1235.

(Continued)

*Primary Examiner*—Gims S Philippe (57) ABSTRACT

Techniques to minimize problems with dead zones associated with panoramic cameras are described. A dead zone is an area about a zero degree boundary where a three hundred and sixty degree panoramic image is split so that a two-dimensional panorama can be rendered. Redirection of the zero degree boundary to a position where no object appears is described that prevents an object located in the dead zone from being split between margins of the panorama. Another technique involves reproducing one or more portions of the image that appears at one margin adjacent to an opposite margin so that an object in the dead zone that would normally be split is reproduced in whole. The described techniques may be implemented in a panoramic camera endpoint device or in a client device remote from a camera. The techniques may be applied to live video or to previously recorded video.

18 Claims, 10 Drawing Sheets

U.S. PATENT DOCUMENTS

| | | | |
|---|---|---|---|
| 6,111,702 A | 8/2000 | Nalwa | |
| 6,115,176 A | 9/2000 | Nalwa | |
| 6,128,143 A | 10/2000 | Nalwa | |
| 6,141,145 A | 10/2000 | Nalwa | |
| 6,144,501 A | 11/2000 | Nalwa | |
| 6,175,454 B1 | 1/2001 | Hoogland et al. | |
| 6,195,204 B1 | 2/2001 | Nalwa | |
| 6,219,089 B1 | 4/2001 | Driscoll, Jr. et al. | |
| 6,219,090 B1 | 4/2001 | Nalwa | |
| 6,222,683 B1 | 4/2001 | Hoogland et al. | |
| 6,285,365 B1 * | 9/2001 | Nalwa | 715/835 |
| 6,313,865 B1 | 11/2001 | Driscoll, Jr. et al. | |
| 6,331,869 B1 | 12/2001 | Furlan et al. | |
| 6,337,708 B1 | 1/2002 | Furlan et al. | |
| 6,341,044 B1 | 1/2002 | Driscoll, Jr. et al. | |
| 6,346,967 B1 | 2/2002 | Gullichsen et al. | |
| 6,356,296 B1 | 3/2002 | Driscoll, Jr. et al. | |
| 6,356,397 B1 | 3/2002 | Nalwa | |
| 6,369,818 B1 | 4/2002 | Hoffman et al. | |
| 6,373,642 B1 | 4/2002 | Wallerstein et al. | |
| 6,388,820 B1 | 5/2002 | Wallerstein et al. | |
| 6,392,687 B1 | 5/2002 | Driscoll, Jr. et al. | |
| 6,424,377 B1 | 7/2002 | Driscoll, Jr. et al. | |
| 6,426,774 B1 | 7/2002 | Driscoll, Jr. et al. | |
| 6,459,451 B2 | 10/2002 | Driscoll, Jr. et al. | |
| 6,466,254 B1 | 10/2002 | Furlan et al. | |
| 6,480,229 B1 | 11/2002 | Driscoll, Jr. et al. | |
| 6,493,032 B1 | 12/2002 | Wallerstein et al. | |
| 6,515,696 B1 | 2/2003 | Driscoll, Jr. et al. | |
| 6,535,649 B1 | 3/2003 | Chiu | 382/274 |
| 6,539,547 B2 | 3/2003 | Driscoll, Jr. et al. | |
| 6,563,528 B2 * | 5/2003 | Satoda | 348/14.05 |
| 6,583,815 B1 | 6/2003 | Driscoll, Jr. et al. | |
| 6,593,969 B1 | 7/2003 | Driscoll, Jr. et al. | |
| 6,597,520 B2 | 7/2003 | Wallerstein et al. | |
| 6,628,825 B1 | 9/2003 | Yamazoe et al. | 382/167 |
| 6,700,711 B2 | 3/2004 | Nalwa | |
| 6,741,250 B1 | 5/2004 | Furlan et al. | |
| 6,756,990 B2 | 6/2004 | Koller | |
| 6,788,340 B1 | 9/2004 | Chen et al. | 348/229.1 |
| 6,795,106 B1 | 9/2004 | Cooper | |
| 6,885,509 B2 | 4/2005 | Wallerstein et al. | |
| 6,917,702 B2 | 7/2005 | Beardsley | 382/154 |
| 6,924,832 B1 | 8/2005 | Shiffer et al. | |
| 6,977,676 B1 * | 12/2005 | Sato et al. | 348/211.11 |
| 7,206,017 B1 * | 4/2007 | Suzuki | 348/36 |
| 7,277,118 B2 * | 10/2007 | Foote | 348/36 |
| 2002/0034020 A1 | 3/2002 | Wallerstein et al. | |
| 2002/0041324 A1 | 4/2002 | Satoda | |
| 2002/0063802 A1 | 5/2002 | Gullichsen et al. | |
| 2002/0094132 A1 | 7/2002 | Hoffman et al. | |
| 2002/0154417 A1 | 10/2002 | Wallerstein et al. | |
| 2003/0142402 A1 | 7/2003 | Carbo et al. | |
| 2003/0146982 A1 | 8/2003 | Tindall | 348/223.1 |
| 2003/0184660 A1 | 10/2003 | Skow | 348/223.1 |
| 2003/0193606 A1 | 10/2003 | Driscoll et al. | |
| 2003/0193607 A1 | 10/2003 | Driscoll et al. | |
| 2003/0220971 A1 | 11/2003 | Kressin | |
| 2004/0008407 A1 | 1/2004 | Wallerstein et al. | |
| 2004/0008423 A1 * | 1/2004 | Driscoll et al. | 359/725 |
| 2004/0021764 A1 * | 2/2004 | Driscoll et al. | 348/14.08 |
| 2004/0252384 A1 | 12/2004 | Wallerstein et al. | |
| 2004/0254982 A1 | 12/2004 | Hoffman et al. | |
| 2005/0046703 A1 | 3/2005 | Cutler | |
| 2005/0117034 A1 | 6/2005 | Cutler | |
| 2005/0285943 A1 | 12/2005 | Cutler | |

FOREIGN PATENT DOCUMENTS

| | | |
|---|---|---|
| WO | WO 98/47291 | 10/1998 |
| WO | WO 00/11512 | 3/2000 |
| WO | WO 2004/004320 A1 | 1/2004 |
| WO | WO 2004/111689 | 12/2004 |
| WO | WO 2004/112290 | 12/2004 |
| WO | WO 2005/002201 | 1/2005 |

OTHER PUBLICATIONS

Choi, K., S: Ko, "New Autofocusing Technique Using the Frequency Selective Weighted Median Filter for Video Cameras", IEEE Transactions on Consumer Electronics, vol. 45, No. 3, Aug. 1999.

Davis, J. Mosaics of scenes with Moving Objects IEEE Comp.Soc. Conf. on Computer Vision and Pattern Recognition, 1998.

Glenn, E., Healey, K. Raghava, "Radiometric CCD Camera Calibration and Noise Estimation", IEEE Trans. PAMI, 16(3):267-276,1994.

Hasler, D. and S. Susstrunk, "Colour Handling in Panoramic Photography", Proceedings of SPIE vol. 4309, 2001.

Kang, S.B. and R Weiss. "Can We Calibrate a Camera using an Image of a Flat, Textureless Lambertian Surface", ECCV,2000.

Kemberova, G. R. Bajcsy, The Effect of Radiometric Correction on Multicamera Algorithms Technical Report MS-CIS-97-17, 1997.

Li, Zhang, Zhang. "Real-Time Multi-View Face Detection", Face and Gesture Recognition, 2002, Washington D.C.

Majumder, LA., Z. He, H. Towles, G. Welch, "Achieving Color Uniformity Across Multi-Projector Displays", IEEE Visualization 2000.

Subbarao, M. and J. Tyann "Selecting the Optimal Focus Measure for Autofocusing and Depth-from-Focus", IEEE Transactions on PAMI, vol. 20, No. 8, August 1998.

Szeliski, R. and H.-Y. Shum. Creating full view panoramic image mosaics and Environment Maps. Computer Graphics (SIGGRAPH '97), pp. 251-258, 1997.

Szeliski, R. Video mosaics for virtual environments. *IEEE Computer Graphics and Applications*, pp. 22-30, Mar. 1996.

Uyttendaele, M., A, Eden, and R. Szeliski. Eliminating ghosting and exposure artifacts in image mosaics. In IEEE Computer Society Conference on Computer Vision and Pattern Recognition (CVPR'2001), vol. II pp. 509-516, Kauai, Hawaii, Dec. 2001.

Widjaja, J. and S. Jutamulia, "Use of Wavelet Analysis for Improving Autofocusing Capability", Optics Communications 151, pp. 12-14, 1998.

European Patent Office European Search Report, for European Patent Application No. 05 111 765.3, Apr. 4, 2006, Munich.

J. Davis "Mosaics of scenes with moving objects", Proceedings of IEEE Computer Society Conference on Computer Vision and Pattern Recognition, Jun. 23-25, 1998, pp. 354-360.

* cited by examiner

FIG. 1a
Background

FIG. 1b
Background

MINIMIZING DEAD ZONES IN PANORAMIC IMAGES

CROSS-REFERENCE(S) TO RELATED APPLICATIONS

This application is a continuation-in-part of U.S. patent application Ser. No. 10/177,315 entitled "A System and Method for Camera Color Calibration and Image Stitching", filed Jun. 21, 2002 by the present inventor and assigned to Microsoft Corp., the assignee of the present application. Priority is claimed to said application which is hereby incorporated by reference for all that it teaches and discloses.

This application is also a continuation-in-part of U.S. patent application Ser. No. 10/608,363 entitled "Omni-Directional Camera With Calibration And Up Look Angle Improvements", filed Jun. 27, 2003 by the present inventor and assigned to Microsoft Corp., the assignee of the present application. Priority is claimed to said application which is hereby incorporated by reference for all that it teaches and discloses.

TECHNICAL FIELD

The following description relates generally to image processing. More particularly, the following description relates to panoramic camera systems.

BACKGROUND

Panoramic images are wide-angle camera images that span up to three hundred and sixty degrees (360°). Panoramic video camera devices are especially useful in a conference room scenario. A single panoramic video camera can capture conference participants over a wide span of the conference room so that a viewer can see most or all of the conference participants simultaneously. A panoramic video camera device that can capture a three hundred and sixty degree (360°) view of the conference room can image all conference participants.

But a two-dimensional three hundred and sixty degree (360°) panoramic image has a left margin and a right margin at that represent a 0°/360° boundary of an imaged area. If a person happens to be seated at this boundary, then a portion of an image of that person will appear at the left margin of the panoramic image and a portion of that person will appear at the right margin of the panoramic image. A small area about the boundary is referred to as a "dead zone" since any object in that area will be split in a resultant panoramic image.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Cameras and techniques are described herein for providing a three hundred and sixty degree (360°) panoramic image without splitting an object image at a left/right margin boundary of the panoramic image, i.e. without "dead zones." As used herein, the term "dead zone" refers to an area in a space imaged by a three hundred and sixty degree (360°) camera where a resultant panoramic image is divided for presentation in a two-dimensional format. Typically, an object located along a boundary where such a division is made will appear in two parts—one portion of the object will appear at a left margin of the panoramic image and one portion of the object will appear at a right margin of the panoramic image.

Although the present description refers to examples of panoramic cameras that image a three hundred and sixty degree (360°) area, it is noted that one or more of the described techniques may be used in cameras that image less than a three hundred and sixty degree (360°) area. As long as an object located in a "dead zone" as described here can be split on a resultant image, the present techniques may be applied.

Figure 1A:
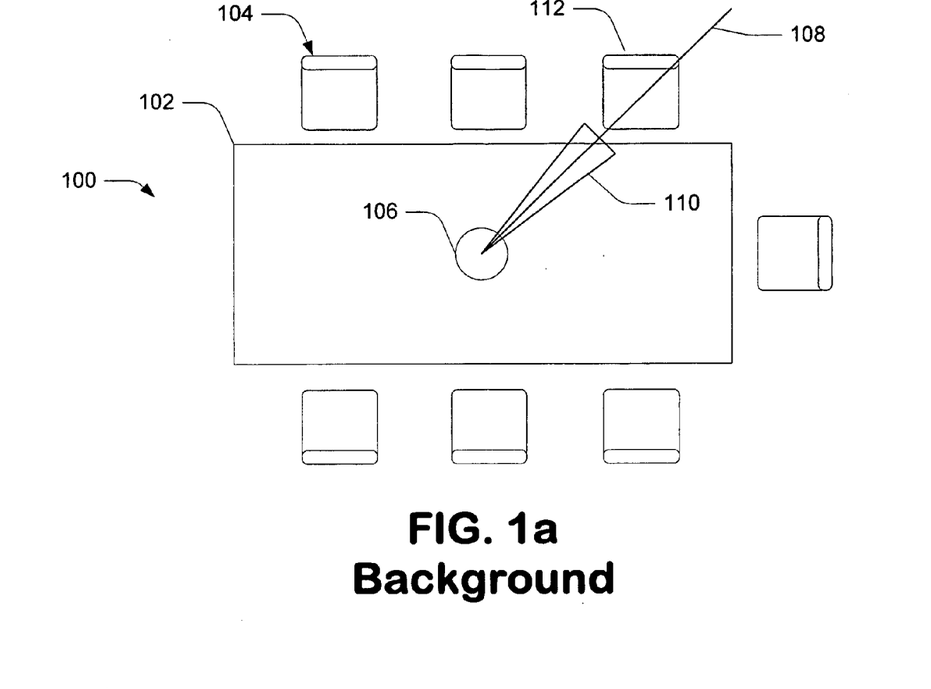
FIG. 1a is a diagram depicting an exemplary conference room table and chairs having a panoramic camera placed thereon.
Figure 1B:
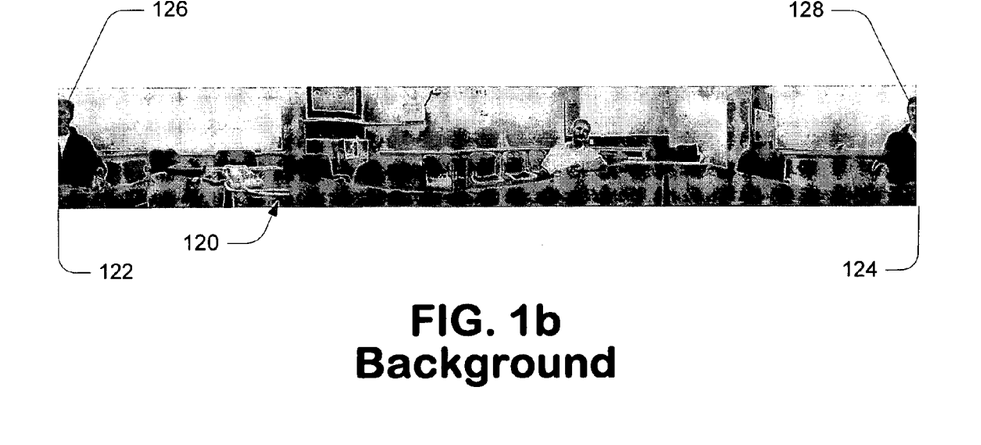
FIG. 1b is an exemplary panoramic image of meeting participants situated around a conference room table.

FIGS. 1a and 1b illustrate a dead zone and a problem typically encountered when an imaged object (i.e. a person) is located in the dead zone. FIG. 1a is a diagram depicting an exemplary conference room configuration 100. The configuration shown includes a conference room table 102, several conference room chairs 104 and a panoramic camera 106 situated in the center of the top of the table 102.

A zero degree (0°) boundary 108 is shown emanating from the panoramic camera 106. The zero degree (0°) boundary 108 indicates a point at which the imaged area is divided so that the imaged area can be displayed in a two-dimensional format. A dead zone 110 is shown about the zero degree (0°) boundary 108. An object located within the dead zone 110 may be divided into two partial images upon rendering the panoramic image. For example, a person seated in conference room chair 112 would likely appear in two portions. One side of the person's face would appear adjacent to a left margin of a resultant panoramic image, and the other side of the person's face would appear adjacent to a right margin of the resultant panoramic image.

FIG. 1b is an exemplary panoramic image 120 where a person is seated in a dead zone. The exemplary panoramic image 120 has a left margin 122 and a right margin 124. An image of a face of a person (situated as if they were seated in conference room chair 112) is shown in a first half 126 located adjacent to the left margin 122 and a second half 128 located adjacent to the right margin 124. This is an example of how a face of a person seated in the dead zone 110 appears in a resultant panoramic image.

Several techniques are discussed herein for minimizing dead zone problems in three hundred and sixty degree (360°) panoramic images. One technique involves physically rotating a camera or a portion of a camera so that a zero degree (0°) boundary (a location where a resultant image is split to render a two-dimensional format) is oriented toward an area that contains no object or an insignificant object.

Another way to minimize dead zone problems is to make a similar adjustment by way of computer instruction translation in software, hardware, firmware, or the like. A panoramic camera described herein utilizes several individual cameras to image a three hundred and sixty degree (360°) span (although the described techniques may be applied to a single panoramic camera spanning up to three hundred and sixty degrees (360°)). A pixel remapping function is used to remap pixels in each individual image to a panoramic image. If an object to be imaged is located in a dead zone, the remapping function can be altered (i.e. the panoramic image is rotated) so that no object appears in a dead zone.

In one or more of the described techniques, an optimum orientation of a zero degree (0°) boundary may be determined manually or automatically. In an automatic determination of the zero degree boundary (0°), a face tracking mechanism is used to determine an area in which no person's face appears. The zero degree (0°) boundary is then set to that area. As a result, no person is imaged in the dead zone that surrounds that boundary.

An additional technique that is shown and described herein determines a portion of an image that is adjacent to a zero degree (0°) boundary (i.e. a portion of an image that will be on a margin of a resultant panoramic image) and reproduces that portion of the image adjacent to the opposite margin. As a result, if a person in a dead zone is imaged, then instead of that person's image being split on the margins, a full image of that person appears adjacent to one of the margins.

All of these techniques are shown and described in greater detail below, with reference to the figures included herewith. It is noted that the specific implementation shown and described herein are shown by way of example and not by way of limitation. Other systems and methods may be implemented within the spirit and scope of the description provided herein and the claims appended hereto.

Exemplary Photographic Device

Figure 2:
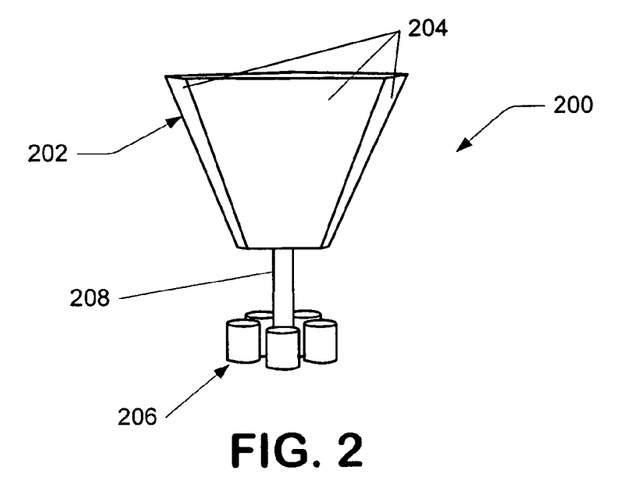
FIG. 2 is a diagram of an exemplary panoramic photographic device that utilizes an inverted pyramidal mirror and multiple cameras.

FIG. 2 is a diagram of an exemplary panoramic photographic device 200 in accordance with the present description. Although a particular configuration is shown for the exemplary panoramic photographic device 200, it is noted that the particular configuration is shown by way of example only and that other configurations of panoramic camera devices may be utilized in accordance with the present description.

The exemplary panoramic photographic device 200 includes an inverted pyramidal mirror assembly 202 and multiple cameras 206. The inverted pyramidal mirror assembly 202 includes multiple mirror facets 204, there being one mirror facet 204 corresponding to each of the multiple cameras 206. The inverted pyramidal mirror 202 is positioned over the multiple cameras 206 by a column 208.

The configuration of the exemplary panoramic photographic device 200 achieves a near center of projection that reduces parallax errors in a panoramic image formed by the panoramic photographic device 200. Such a configuration is shown and described in one or more patent applications incorporated by reference herein.

Exemplary Camera Configuration

Figure 3:
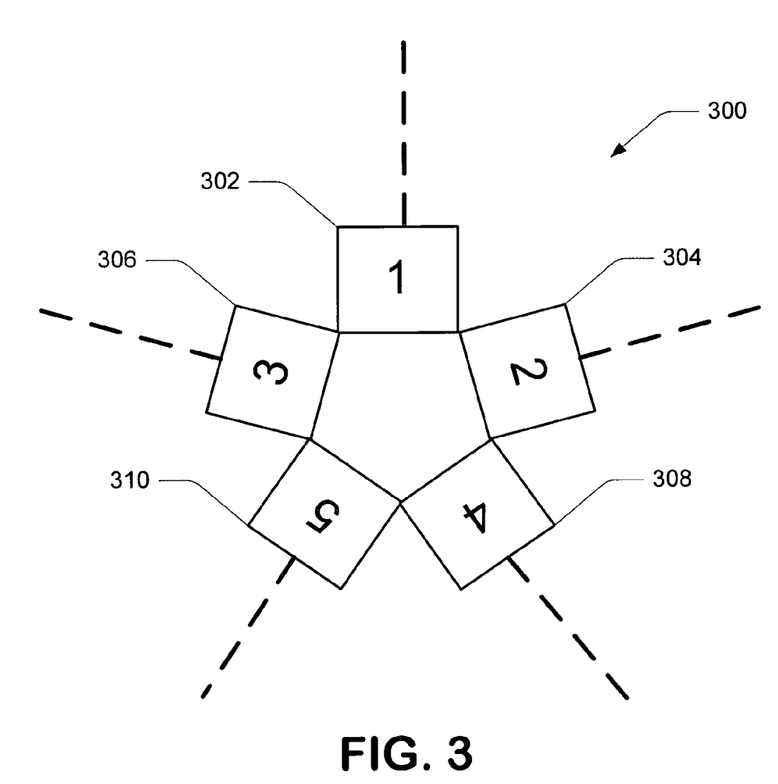
FIG. 3 is a diagram of an exemplary panoramic camera configuration.

FIG. 3 is a diagram of an exemplary panoramic camera 300 in a 360° camera configuration. The diagram is a rudimentary representation of the panoramic photographic device 200 shown in FIG. 2. It is noted that although an example of a multi-camera 360° panoramic photographic device is shown and discussed herein, the present description applies to any wide-angle photographic device which is prone to splitting images of objects that are located in an area where the image is split for two-dimensional representation. In the following discussion, continuing reference is made to elements and reference numerals shown and described in FIG. 2.

The diagram shows multiple cameras 302-310 arranged in a pentagonal configuration to form the panoramic camera 300, corresponding with the pentagonal shape of the inverted pyramidal mirror 202 of FIG. 2. Each camera 302-310 photographs a different area of the environment of the panoramic camera 300.

Since the imaged area is a complete three hundred and sixty degrees (360°) and a resultant image must be rendered in a two-dimensional format, the imaged area must be divided at some point so that the resultant panoramic image can be "unrolled". It is this division that can cause problems in the resultant image since an object located along such a division will be rendered along both side margins of the resultant image.

Exemplary Image Assembly Module

Figure 4A:
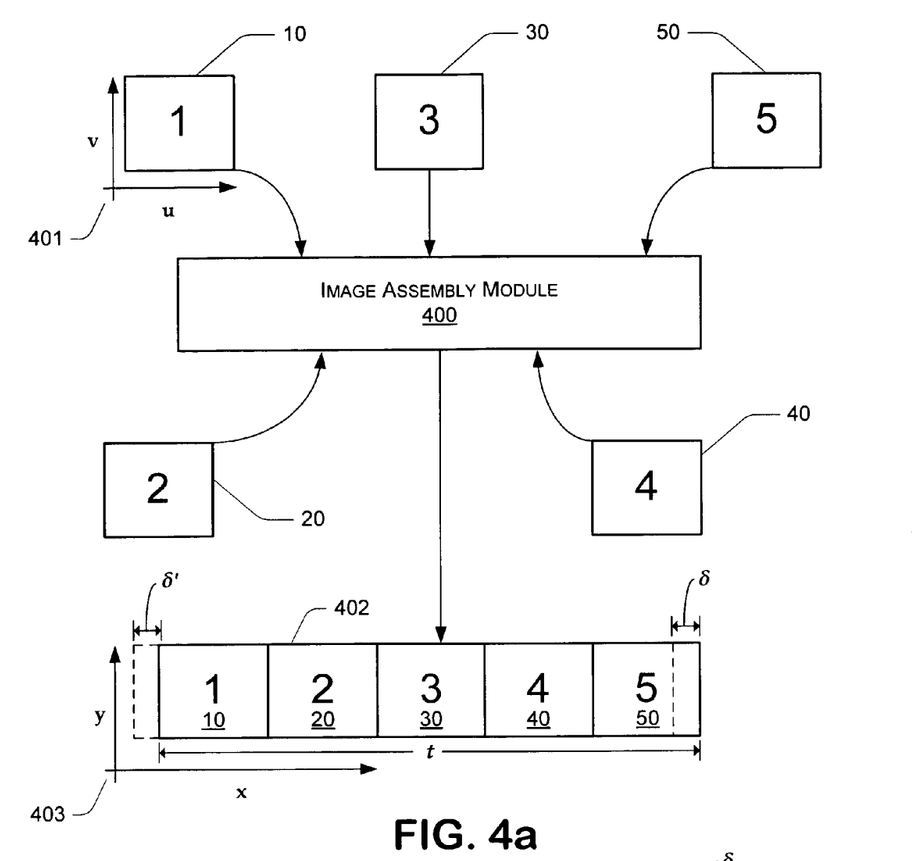
FIG. 4a is a diagram of an exemplary image assembly module that assembles individual images to form an exemplary panoramic image with a first duplicated section.

FIG. 4 is a diagram of an exemplary image assembly module 400 that assembles individual images 10-50 to form a panoramic image 402. The image assembly module 400 receives as input one image from each camera in the panoramic camera. For purposes of the following discussion, images taken by the cameras 302-310 shown in FIG. 3 are identified as image "1" 10, image "2" 20, image "3" 30, image "4" 40 and image "5" 50, respectively. These individual images are assembled to form the single panoramic image 402.

The image assembly module 400 utilizes a remapping function that maps pixels in individual image space to pixels in a panoramic image space. Pixels in individual images 10-50 are addressed according to a (u, v) coordinate grid 401. Pixels in the panoramic image 402 are addressed according to an (x, y) coordinate grid 403. The image assembly module 400 maps each pixel from a (u, v) coordinate to an (x, y) coordinate location until all pixels in individual images 10-50 are reproduced in the panoramic image 402.

The remapping function is calibrated so that the individual images are stitched together seamlessly where the images are joined together. This is so that the panoramic image 402 appears seamless, i.e. no distracting artifacts occur between individual images.

It is noted that not all pixels in the individual images are necessarily used in the resultant panoramic image due to methods required to properly stitch the individual images so that seams between images are minimized in the panoramic image. In addition, one or more distortion correction algorithms may be applied to normalize a view of the panoramic image. Image stitching techniques are shown and described in one or more of the patent application incorporated herein by reference.

One technique that can be used to correct dead zone problems is to reproduce a portion of an image adjacent to one side margin and append the reproduced portion to the other side margin. In FIG. 4a, a delta portion δ of individual image is reproduced from one side of the panoramic image 402 and is appended (delta prime portion δ') to an opposite side of the panoramic image to create a 360+δ panoramic image.

A width of δ' can vary but in a video conferencing situation similar to that discussed here, δ' is approximately the width of a face of a person. In a typical conference room panorama, the width of a person's face is typically about four (4) to fourteen (14) degrees, depending on how far the person is from the camera.

The width of δ can be determined by default, automatically or manually. When the width is determined manually, a user interacts with a user interface to set a desired width of δ. When the width is automatically determined (such as in combination with a face tracker), the automatic setting should be configured to occur at certain intervals. Meeting situations can change, with people coming and going at various times. If the width of width of δ is automatically adjusted whenever a person enters or leaves the dead zone, undesirable results may occur. In addition, an automatic implementation may include a user option to disable the automatic determination of width of δ at any time.

This technique is described in greater detail below, with respect to one or more subsequent figures. This technique may be used with or without first orienting the camera to a desired position as described below.

When the delta prime portion δ' is appended to the panoramic image 402, a width (t) of the panoramic image is increased to (t+δ'). It may be desirable to resize the panoramic image 402 so that an aspect ratio of a typical panoramic image is maintained. Other methods may be utilized to resize the panoramic image. For example, to maintain the same size and image aspect ratio, the resultant panoramic image 402 (t+δ') could be padded with a horizontal strip appended to the top and/or bottom of the panoramic image 402.

Figure 4B:
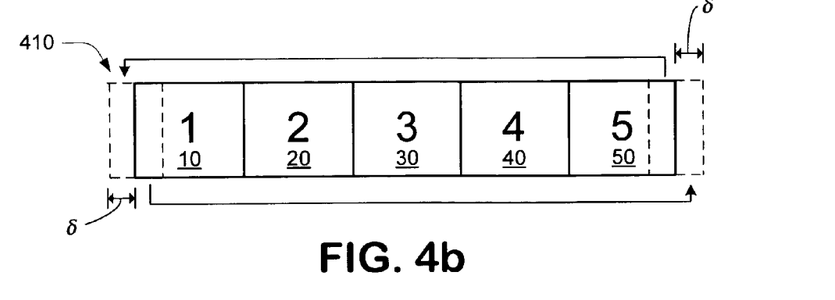
FIG. 4b depicts the exemplary panoramic image of FIG. 4a with a second duplicated section.

FIG. 4b depicts a panoramic image 410 similar to the panoramic image 402 shown in FIG. 4a. The panoramic image 410 includes two (2) delta portions (δ), one on each end of the panoramic image 410. The process for creating the panoramic image 410 is similar to the process described with respect to FIG. 4a in that an area greater than three hundred and sixty degree (360°) is reproduced.

Samples imaged by a panoramic camera that are adjacent to each side of a zero degree (0°) boundary are mapped to two locations—a first location in nominal panoramic space, and a second location on an opposite side of the panoramic image 410.

Appending two delta portions (δ) to a panoramic image will result in an image of a person sitting in the dead zone to appear twice in the resultant panoramic image 410—once near each margin. However, as will be discussed below, appending a reproduced portion of an image to the image may be combined with one or more other techniques to avoid duplication of a person's image in the panoramic image 410.

The portion of an image that is reproduced (δ) can be determined at any stage during the image assembly process. In one implementation, the panoramic image 402 is created before δ is copied and δ' is appended to the panoramic image 402. Other implementations may include remapping tables configured to duplicate pixels in this manner during the remapping process. Any such technique may be utilized to accomplish the same end result described above.

Figure 5A:
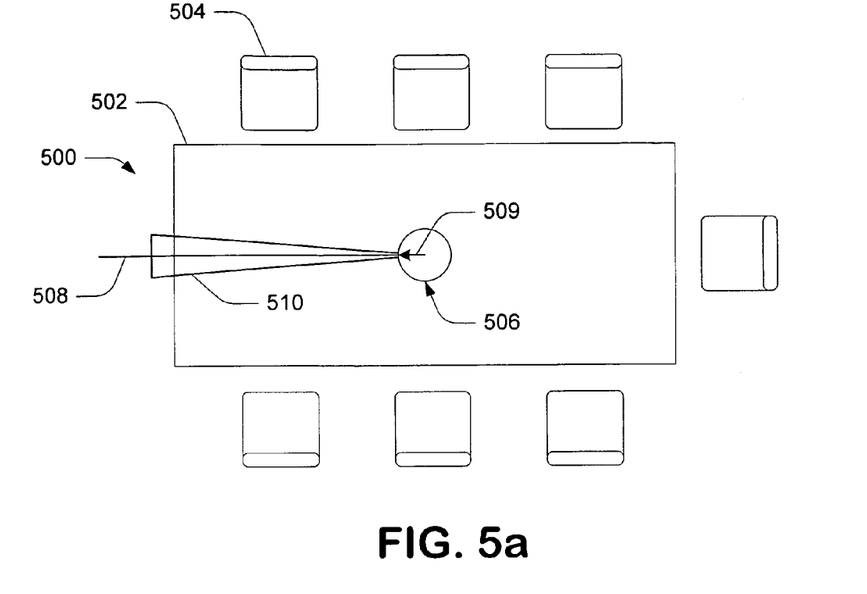
FIG. 5a is a diagram depicting an exemplary conference room table and chairs with the table having a panoramic camera placed thereon.

FIG. 5a depicts an exemplary conference room setting 500 of table 502, chairs 504 and panoramic camera 506. In the example shown in FIG. 5a, a zero degree (0°) boundary 508 of the panoramic camera 506 is manually oriented toward a position of the table 502 where no person is seated. The location of the boundary 508 is indicated on the camera 506 by a boundary indicator 509 that is visible to a user. To orient the panoramic camera 506, a user simply rotates the panoramic camera 506 to a point where the boundary indicator 509 is oriented toward a location in which a subject does not appear, as shown.

As a result, no person appears in a dead zone 510 that occurs about the zero degree (0°) boundary 508. Therefore, each person in the conference room is fully imaged on a panoramic image captured by the panoramic camera 506.

Figure 5B:
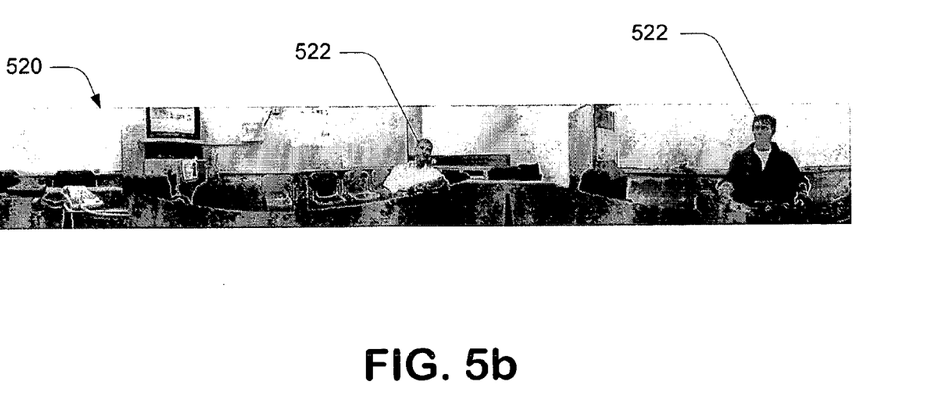
FIG. 5b is an exemplary panoramic image of meeting participants with minimized dead zones.

FIG. 5b is a representation of an exemplary panoramic image 520 of meeting participants 522 situated when the panoramic camera 506 is oriented to a location where no person is located. Each image 522 of a person is shown in full, i.e. no image of a person is split between margins of the panoramic image 520.

The situation shown in FIG. 5a and FIG. 5b is frequently available under circumstances where there is an optimum location for the dead zone, such as in rooms where a projector screen is in use. Since nobody usually sits between the conference table and the projector screen, an optimum location to orient the zero degree (0°) boundary is toward the projector screen. However, not all situations are so optimally presented.

Computational Rotation to Establish Zero Degree Boundary

In addition to the technique described above, wherein the camera is physically re-oriented to direct the location of the zero degree (0°) boundary, the zero degree (0°) boundary may be manually indicated by a user and then the panoramic image is computationally rotated to orient the image with respect to the zero degree (0°) boundary.

To accomplish such rotation of the panoramic image, the remapping function (previously described with respect to the image assembly module 400 of FIG. 4) computes the angle difference between a nominal zero degree (0°) boundary and the selected zero degree (0°) boundary. This difference is factored into the remapping function to rotate the panoramic image to a position wherein the margins of the panoramic image correspond to the selected zero degree (0°) boundary.

Rotation is accomplished by adding an offset equaling the difference between the nominal zero degree (0°) boundary and the selected zero degree (0°) boundary to the x coordinate in the (x, y) coordinate system of the panoramic image (403, FIG. 4a).

Setting the zero degree boundary (0°) can be accomplished in one of several ways. For example, a user interface unit (not shown) of a panoramic camera (not shown) may contain means for effecting a rotation of a boundary indicator, such as arrow buttons. A user would position the boundary indicator (e.g. on a liquid crystal display (LCD)) by pressing right or left arrow buttons. Other techniques may be used to accomplish the same result.

Automatic Location of Zero Degree (0°) Boundary

Figure 6:
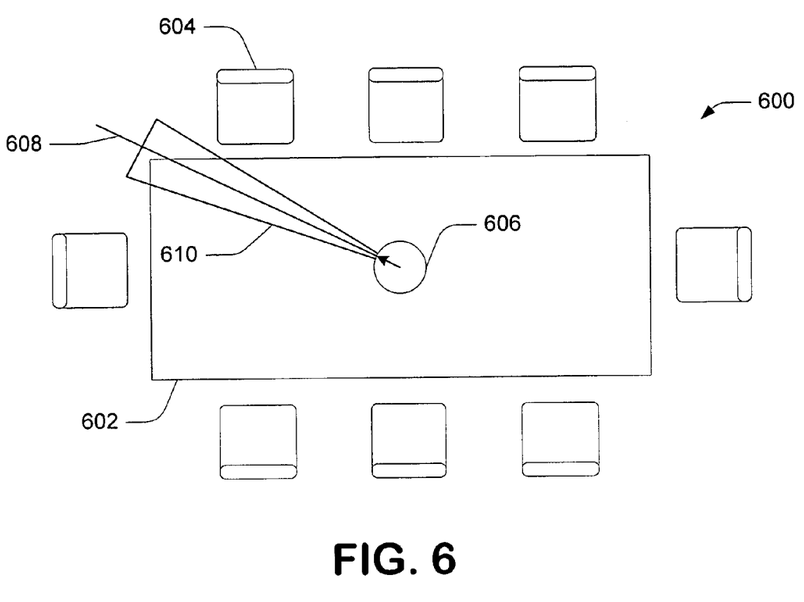
FIG. 6 is a diagram depicting an exemplary conference room table and chairs with the table having a panoramic camera placed thereon.

FIG. 6 depicts an exemplary conference room configuration 700 similar to that shown in FIG. 5a. The exemplary conference room configuration 600 includes a conference room table 602, several conference room chairs 604 and a panoramic camera 606. In the present example, there is a chair 604 present along both sides and at both ends of the conference room table 602. Therefore, there is no clear position in which to orient the camera 606.

In FIG. 6, the panoramic camera 606 is shown with a zero degree (0°) boundary oriented toward a corner of the table 602, between two chairs 604. A dead zone 610 associated with the zero degree (0°) boundary 608 falls in between two conference participants so as to avoid splitting an image of a participant.

The zero degree (0°) boundary 608 may be manually oriented as previously described, or it may be automatically oriented toward an optimal location using a face tracking mechanism. Face tracking mechanisms, or "face trackers," are known in the art and can be used to determine a best location for the zero degree (0°) boundary 608.

Typically, an optimum location as determined using a face tracker is a center of the largest detected angle between faces (or other objects). A face tracking mechanism locates each face in the imaged area and determines an angle between each two adjacent faces. The largest of these angles is used to orient the zero degree (0°) boundary 608.

A representation of the boundary selection mechanism described above is:

$$j = \underset{i=1\ldots n}{\mathrm{argmax}}(|\theta_i - \theta_{mod(i+1,n)}|)$$

$$\theta = \frac{\theta_j + \theta_{mod(i+1,n)}}{2}$$

where $\{\theta_1, \ldots, \theta_n\}$ are the sorted angles of faces detected by a face tracker, and $\theta$ is the angle has the maximum separation between faces. It is noted that in the equations shown above, all angle subtraction and addition is computed modulo 360 degrees.

When the optimum boundary has been determined, the remapping function (see discussion of FIG. 4a above) is adjusted to rotate the panoramic image so that the desired boundary is achieved.

This and other previously described techniques for adjusting the zero degree (0°) boundary are described in greater detail below, with respect to subsequent figures.

Exemplary Camera

Figure 7:
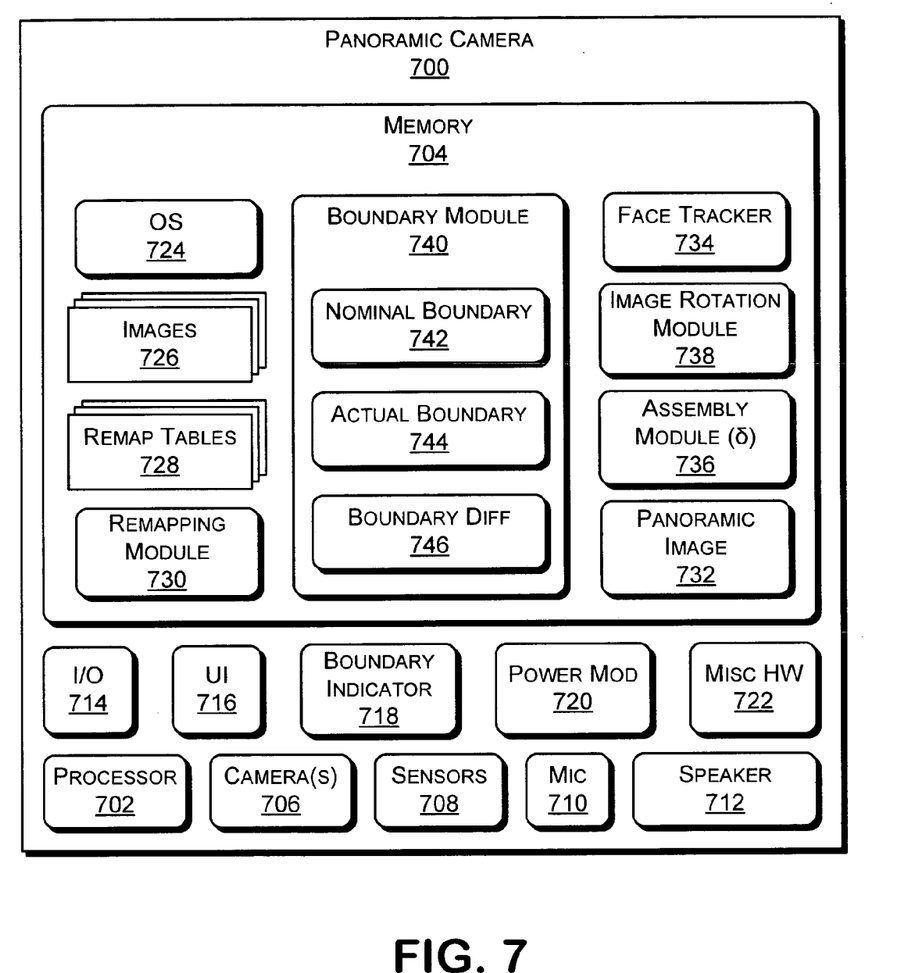
FIG. 7 is a block diagram depicting an exemplary panoramic camera.

FIG. 7 is a block diagram of an exemplary panoramic camera 700 in accordance with the implementations described herein. In the following example, the exemplary panoramic camera is more or less a complete video conferencing endpoint that includes a panorama camera as well as other functionality that could be separated into one or more other devices in one or more alternative implementations. One such alternative implementation is shown and described in FIG. 8 below. Other specific configurations may be implemented in accordance with the present description and claims.

In the following discussion, continuing reference is made to elements and reference numerals shown and described in previous figures. Although specific elements are shown and particular functionality is attributed to specific elements, it is noted that the described functions may be allocated to alternate elements in alternative configurations. Furthermore, although elements are shown as hardware or software elements, any element may be configured in hardware, software or firmware.

The exemplary panoramic camera 700 includes a processor 702, memory 704 and at least one camera 706. In the previous examples, there are five (5) cameras 706 included in one panoramic camera. The panoramic camera 700 also includes one or more sensors 708 typically found in cameras (e.g. charged coupled device (CCD), Complementary Metal-Oxide Semiconductor (CMOS), etc.) for sensing light and transmitting electronic information. Typically, there is one sensor 708 for each camera 706.

The panoramic camera 700 may also include a microphone 710 (or microphone array) and/or one or more speakers 712. In a video conference camera, for example, a microphone and speaker are necessary to conduct audio communications between remote conference participants.

An input/output (I/O) module 714 is included that consists of one or more units configured to receive external data and/or to transmit data. One example of a common I/O module is a Universal Serial Bus (USB) or other type of port, although the I/O module 714 is not limited thereto. The I/O module 714 may also include a unit configured to communicate with a panoramic camera/client device in a remote location. This includes, but is not limited to, network interface modules, telephone interface modules and the like.

A user interface 716 is also provided with the panoramic camera 700 and includes controls and displays (not shown) by which a user can interface with the panoramic camera 700. Such controls may include buttons, touch pads, touch screens, pointing devices, and/or the like. One type of display that may be used includes, but is not limited to, a liquid crystal display (LCD) screen or the like.

A boundary indicator 718 may also be included in the panoramic camera 700. Various types of boundary indicators 718 may be used to identify a nominal orientation of a zero degree (0°) boundary within the camera, i.e. an axis along which an image taken by the camera 700 is divided to render a two-dimensional image. As previously shown and described, a boundary indicator (509, FIG. 5) may be a marking on an external portion of the camera, such as an arrow, a dot, a line, etc. Any other type of indicator may be used (such as a light emitting diode (LED)) as long as a user can infer a direction of a zero degree (0°) boundary from the location of the indicator.

A power module 720 supplies electrical power to the panoramic camera 700 and the panoramic camera 700 includes other miscellaneous hardware 722 elements that may be required to carry out typical functionality of such a camera.

The memory 704 stores an operating system 724 that includes processor-executable instructions for carrying out operational functionality for the panoramic camera 700 and its components. Multiple images 726 detected by the cameras 706 are stored in the memory 704.

One or more remapping tables 728 are also stored in the memory 704 and are utilized by a remapping module 730 to determine a correct mapping of individual images 726 from image space into a panoramic space to create a panoramic image 732. Details of one or more remapping techniques are described in U.S. patent application Ser. No. 10/177,315 entitled "A System and Method for Camera Color Calibration and Image Stitching", filed Jun. 21, 2002 assigned to the assignee of the present application. Said application has been incorporated by reference above.

A face tracker 734 is stored in the memory 704 and is used to automatically detect faces in, for example, a meeting situation. Any face tracking mechanism known in the art may be incorporated into the panoramic camera 700 for the purposes described herein. The face tracker 734, in addition to locating faces, is also configured to compute an angle or distance between two adjacent faces.

An example of one or more face tracking mechanisms is described in greater detail in U.S. patent application Ser. No. 10/006,927 entitled "Automatic Detection and Tracking of Multiple Individuals Using Multiple Cues," by Yong Rui and Yunqiang Chen, filed Dec. 3, 2001 and assigned to Microsoft Corp. Said application is incorporated herein by reference for all that is discloses and teaches.

An assembly module 736 is stored in the memory 704 and is configured to work in conjunction with the remapping module 730 and the remapping tables 728 to assemble the individual images 726 into the panoramic image 732. One function that may be performed by the assembly module 736 is to determine a portion (δ) of an image 726 adjacent to one side of a zero degree (0°) boundary that can be reproduced adjacent to the other side of the zero degree (0°) boundary (as δ') to minimize problems with a dead zone around the zero degree (0°) boundary.

Such functionality has been previously described and may or may not be included in a particular configuration of a panoramic camera 700 in accordance with the present description. Further discussion of the assembly module 736 and functionality thereof is discussed in greater detail below.

The memory 704 also stores a rotation module 738. The rotation module 738 is configured to determine a distance between a default, or nominal, zero degree (0°) boundary of the panoramic camera 700 to an actual zero degree (0°) boundary (set automatically or manually by a user). The rotation module 738 determines an appropriate offset (x-axis offset) that should be included in a remapping function. By offsetting the zero degree (0°) boundary, a potential problems associated with a dead zone can be minimized as previously described.

A boundary module 740 is also included in the memory 704 of the panoramic camera 700. The boundary module 740 handles functions related to determination of a nominal boundary 742, an actual boundary 744 and a boundary difference 746. The nominal boundary 742 will typically be a default boundary position set during the manufacturing process, either by storing an indication of the boundary in memory or in hardware. The nominal boundary 742 may then be retrieved and utilized in subsequent computations.

The actual boundary 744 is determined either from user input or from automatic calculations that identify an optimum location for a zero degree (0°) boundary. User input may be retrieved from the user interface 716 or from a discrete hardware element (such as a manual dial) that a user sets to point in a direction of a desired boundary.

Alternatively, the face tracker 734 may be used to determine locations of faces of meeting participants. The face tracker 734 (or some other module such as the boundary module 740) may then use the face location information to determine an optimum location for a zero degree (0°) boundary, i.e. a location having a greatest distance between two faces. The boundary difference 746 is then determined in degrees, offset units or the like so that a remapping function can be configured to implement the appropriate offset.

Exemplary Client Device

Figure 8:
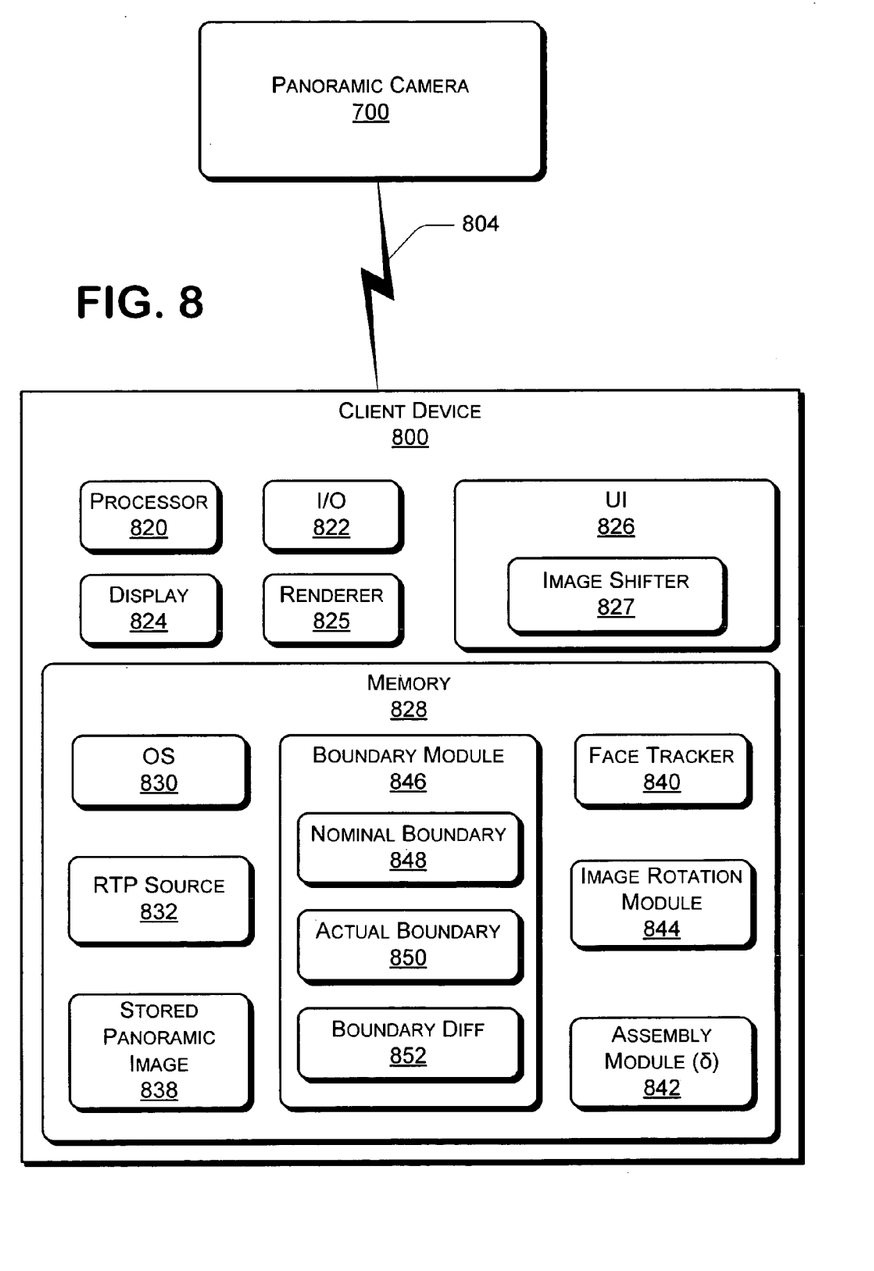
FIG. 8 is a block diagram of an exemplary client device and an exemplary remote camera device.

FIG. 8 is a block diagram of an exemplary client device 800 in accordance with the present description. The exemplary client device 800 may be a general computing device, such as a personal computer, or it may be a limited function device configured specifically for the purposes outlined herein. In the following discussion, continuing reference is made to previous figures and to elements and reference numerals associated therewith.

The client device 800 is configured to communicate with a panoramic camera such as the exemplary panoramic camera 700 shown in FIG. 7. It is noted, however, that the exemplary panoramic camera 700 may have fewer components when used in conjunction with the client device 800, which could handle some of the process attributed to the exemplary panoramic camera in FIG. 7.

The client device 800 and panoramic camera 700 may also be configured to communicate with another client device (not shown) and/or panoramic camera in a remote location. This could be a situation in which two conference rooms, each with a client device and a remote panoramic camera, communicate with each over a communication line, such as a telephone line or a network connection.

The client device 800 includes a processor 820, an I/O module 822, a display 824, a renderer 825 and a user interface 826. The display 824 may be integrated with the client device 800 as shown or it may be separate from the client device 800, such as in a configuration wherein the client device 800 is a personal computer and the display 824 is a monitor. The renderer 825 is a module—such as a video card—configured to render pixel representations in the panoramic image 838 on the display 824.

The user interface 826 includes an image shifter 827 that allows a client device user to input a direction and magnitude of a rotation that the user wants to see in a viewed image. This feature is described in greater detail below.

The client device 800 also includes memory 828 which stores an operating system 830 and an RTP (Real-time Transport Protocol) Source module 832. The RTP Source module 832 is configured to receive the panoramic image 732 from the panoramic camera 700 over a communication channel (not shown) and store the received panoramic image as panoramic image 838. In this particular example, the panoramic camera 700 creates the panoramic image 732 from individual images and transmits the panoramic image to the client device 800.

Various other elements 840-852 similar to and corresponding respectively with elements 734-746 of FIG. 7. Said elements function as previously described except as indicated below. The panoramic image 838 is stored and can be manipulated when the panoramic image 838 is being replayed to minimize any deleterious effects related to a dead zone. The process described below can be applied to the stored panoramic image 838 whether replayed in real time as the image is received from the panoramic camera 700 or at a later time than the panoramic image 838 is received and stored.

In operation, a user may be situated in a first conference room with the client device 800 while the panoramic camera 700 is in a second conference room 802. In this first example, the panoramic camera 700 is streaming video images to the client device 800. The panoramic camera 700 has set an initial zero degree boundary and has created the panoramic image, which it then transmits to the client device 800.

After the panoramic image 838 has been received by the client device 800, the panoramic image 838 may be rotated if there is a problem with a dead zone, i.e. if a person's face is split in the panoramic image 838. This may be accomplished automatically using the face tracker 830 or manually using the image shifter 827.

One way that the rotation may be accomplished manually is by a user clicking on a desired zero degree boundary with a pointing device (not shown) and performing a rotation function by selecting from a menu, dragging a cursor, etc. Other techniques for rotating the image manually are available and any technique known in the art for doing so may be implemented in the context of the present example.

In at least one implementation, the rotation may be accomplished by a face tracker but may then be manually overridden by a user if the user so desires. Such an implementation is described below, with respect to FIG. 11.

In the context of the present example, the image rotation module 844 performs an image transformation function that is known in the art. When a new zero degree boundary is set, the image is divided vertically at the indicated point of the new zero degree boundary, creating two rectangular areas in the image. The two rectangular areas are then swapped so that a line dividing the two rectangles then becomes the margins for the new panoramic image.

It is also noted that the rotation function may be performed in the renderer 825 if the renderer 825 is available and is configured to perform such a function. For example, some video graphics accelerators include sufficient processing power to handle such a function and it may be more efficient to perform the rotation function in such a unit.

When the image shifter 827 is manipulated to manually reset the zero degree boundary, the image rotation module 844 receives feedback that indicates a direction and magnitude of the indicated rotation. The boundary module 846 in the client device 800 stores the nominal boundary 848 that is either received from the panoramic camera 700 or set by the face tracker 840. The actual boundary 850 is the location that is identified from the detected manipulation. The difference (boundary difference 852) is the difference between the nominal boundary 848 and the actual boundary 850. The boundary difference 852 is used to compute an offset by which image pixels are shifted to effect the rotation of the image.

Exemplary Methodological Implementation

Figure 9:
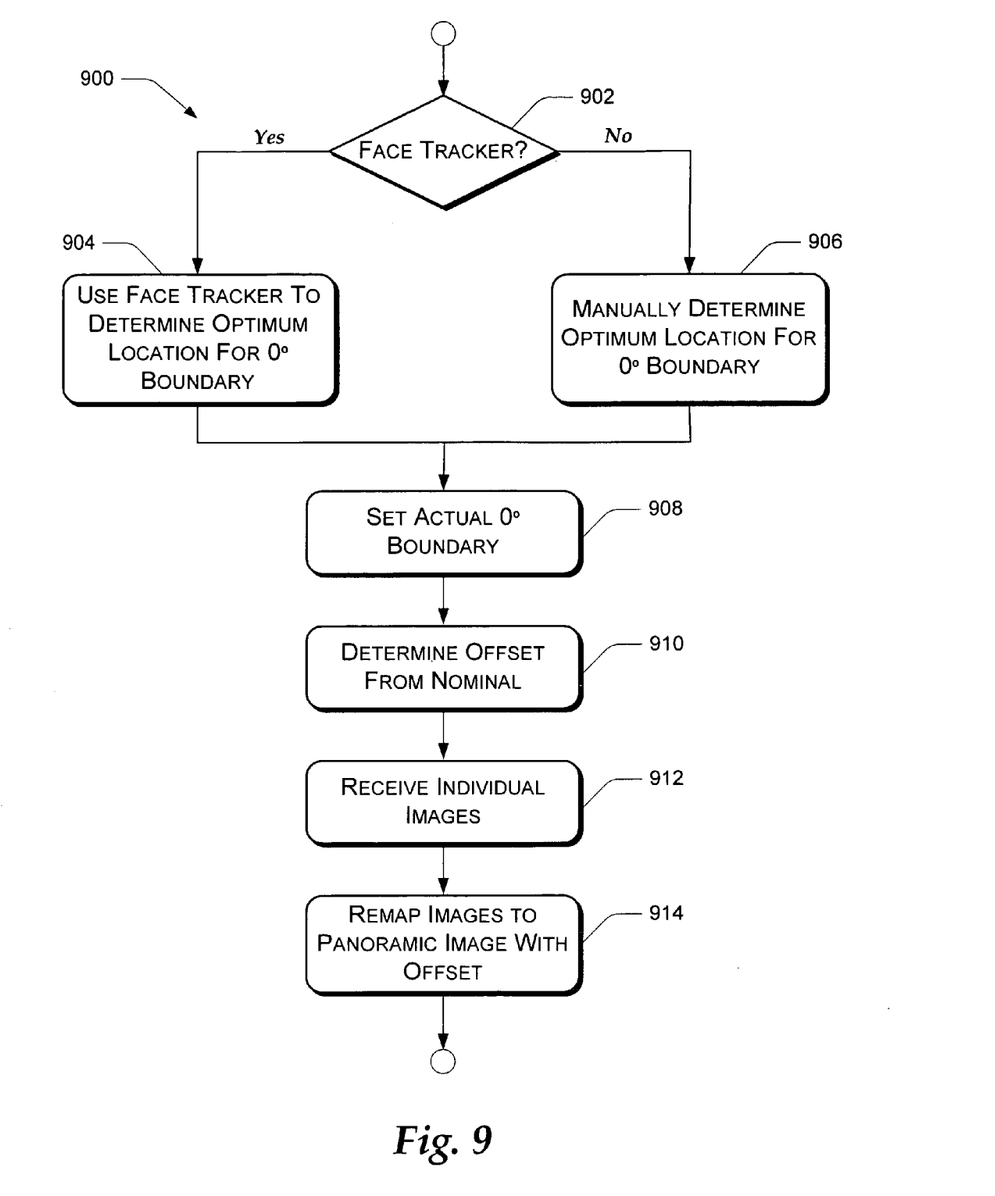
FIG. 9 is a flow diagram of an exemplary process for minimizing dead zones in a panoramic image by altering a zero degree boundary of the imaged area.

FIG. 9 is a flow diagram 900 that depicts an exemplary methodological implementation of process for eliminating dead zone implications from panoramic images. The specific process depicted in the flow diagram 900 relates to FIG. 7, previously described. Although a specific exemplary methodological implementation is shown in a specific order, it is noted that more or less steps may be performed to implement the described functionality and that the steps may be performed in an order other than that shown in the present example.

An optimum location for a zero degree (0°) boundary is determined at block 904 or block 906 depending on whether the determination is made automatically ("Yes" branch, block 902) such as with a face tracker, or manually ("No" branch, block 902.

A camera may include a manual selector by which a user can determine an optimum location and set the manual selector to that location to identify an offset between a nominal boundary location and an actual boundary location. The zero degree (0°) boundary is set accordingly at block 908.

If performed automatically, a face tracking mechanism may be used to automatically detect location of faces of meeting participants that are seated around a conference room table. Any face tracking mechanism known in the art may be used to accomplish this operation. When the locations of the faces are recognized, a determination is made as to the largest area between faces. The actual zero degree (0°) boundary is then set to the center of this area at block 908.

Once the actual zero degree (0°) boundary is determined, an offset is determined at block 910. The offset is the difference between the actual zero degree (0°) boundary and the nominal zero degree boundary. The nominal zero degree boundary is a location where the three hundred and sixty degree image is split for purposes of rendering a two-dimensional panoramic image. This is predetermined as a function of hardware or through a software mechanism.

The offset is a distance that the panoramic image must be rotated to accommodate the newly acquired actual zero degree boundary. This may be determined in actual distance by degrees or in other units compatible with the remapping function according to the (x, y) coordinate system. Once the offset has been determined, the offset is incorporated into the remapping function.

At block 912, the individual images 726 are received. At block 914, the remapping module remaps the individual images 726 into the panoramic image 732, taking the offset into account. The resulting image will not split the image of a person's face between side margins of the panoramic image.

It is noted that the process outlined above is a general procedure that may be altered to conform to any implementation described above or performed in accordance with the description provided herein. Specific steps shown in FIG. 9 may be omitted or altered in any particular implementation. Furthermore, additional steps may be included with those shown in FIG. 9 without departing from the scope of the present description and claims.

Exemplary Methodological Implementation: 360°+δ

Figure 10:
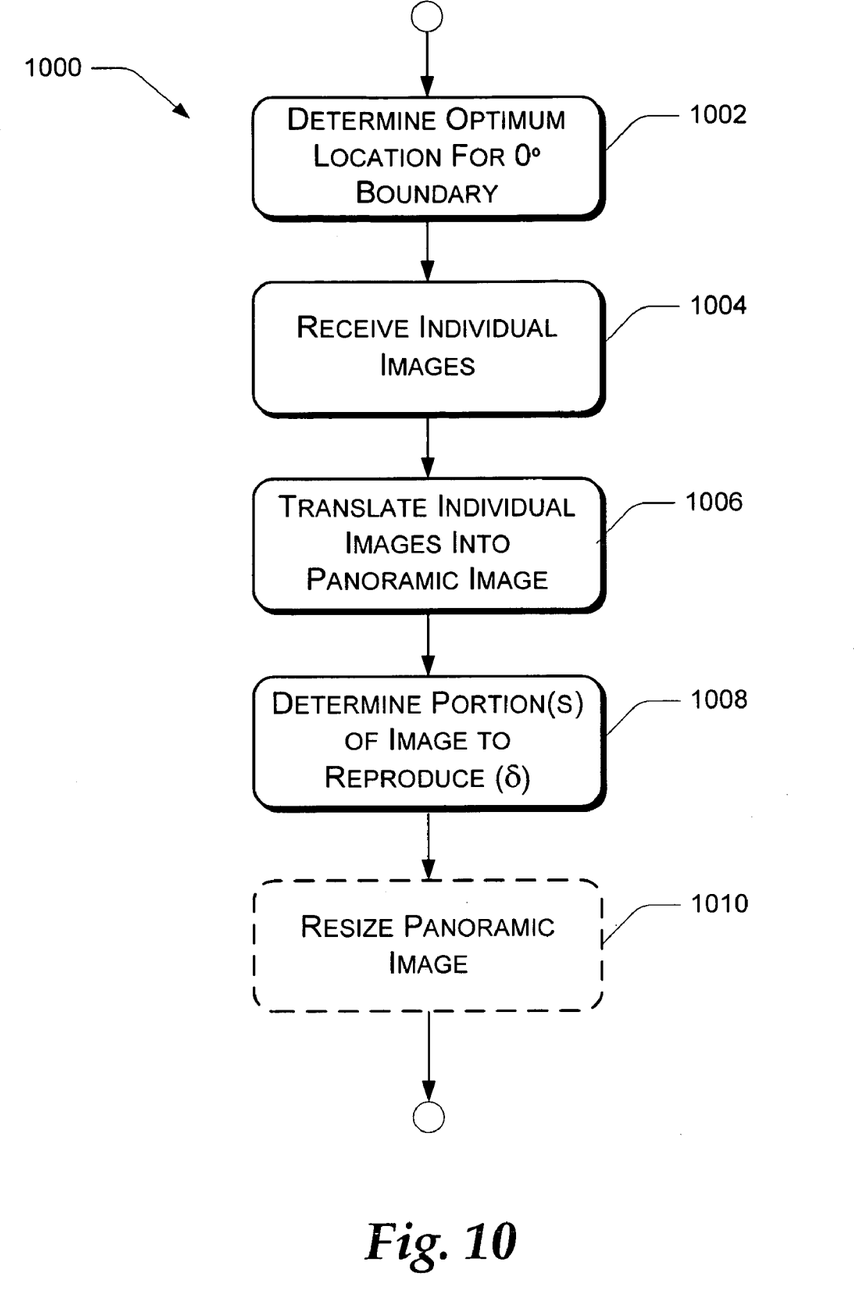
FIG. 10 is a flow diagram of an exemplary process for minimizing dead zones in a panoramic image by reproducing a portion of a panoramic image margin at an opposite margin of the panoramic image.

FIG. 10 is a flow diagram 1000 that depicts an exemplary methodological implementation of process for eliminating dead zone implications from panoramic images by reproducing a portion the panoramic image. The process depicted in the flow diagram 1000 relates specifically to the block diagram shown in FIG. 7, previously described. Although a specific exemplary methodological implementation is shown in a specific order, it is noted that more or less steps may be performed to implement the described functionality and that the steps may be performed in an order other than that shown in the present example.

As previously described, one or more portions of one of the individual images 726 or of the panoramic image 732 that depicts an area adjacent to the zero degree (0°) boundary can be reproduced and appended to the panoramic image so that any object split by the zero degree boundary will appear in whole in the panoramic image (see FIG. 4a and FIG. 4b). This procedure may be performed in addition to resetting an optimum zero degree boundary, but it may also be performed without first making such a determination.

Since an image in the dead zone will be reproduced, finding an optimum location for the dead zone is not necessarily required. However, if a person is seated in the dead zone and this technique is applied, a portion of that person's image will appear adjacent to one margin of a resultant panoramic image and a whole image of the person's face will appear adjacent to the other margin.

At block 1002, an optimum location for the zero degree (0°) boundary is determined similar to the ways described above (FIG. 9, 904-906). The individual images 726 are received at block 1004 and the assembly module 736 stitches the images 726 together to form the panoramic image 732 at block 1006. The assembly module 736 then determines (via a predetermined amount or automatically according to an object in the image or via manual input) a portion (δ) to be reproduced (block 1008).

The portion (δ) is reproduced as δ' and the reproduced portion (δ') is appended to the panoramic image 732 at block 1008. As previously discussed, two portions (δ) may be reproduced and appended to the panoramic image 732, one reproduced portion (δ) at each opposite margin of the panoramic image 732.

If desired, the resultant panoramic image 732 is resized at block 1010 (optional) to the same size as the panoramic image would be if δ' were not appended thereto. This may be done by shrinking the panoramic image 732 horizontally or by padding the top and/or bottom of the panoramic image 732 with dead space (e.g., black or gray bars).

As previously stated, the process described above is but one implementation of several that utilize the addition of one or more duplicated image portions to minimize problems encountered with dead zones. The specific recitation of steps listed above is provided by way of example only and not by limitation.

Exemplary Methodological Implementation: Client Device

Figure 11:
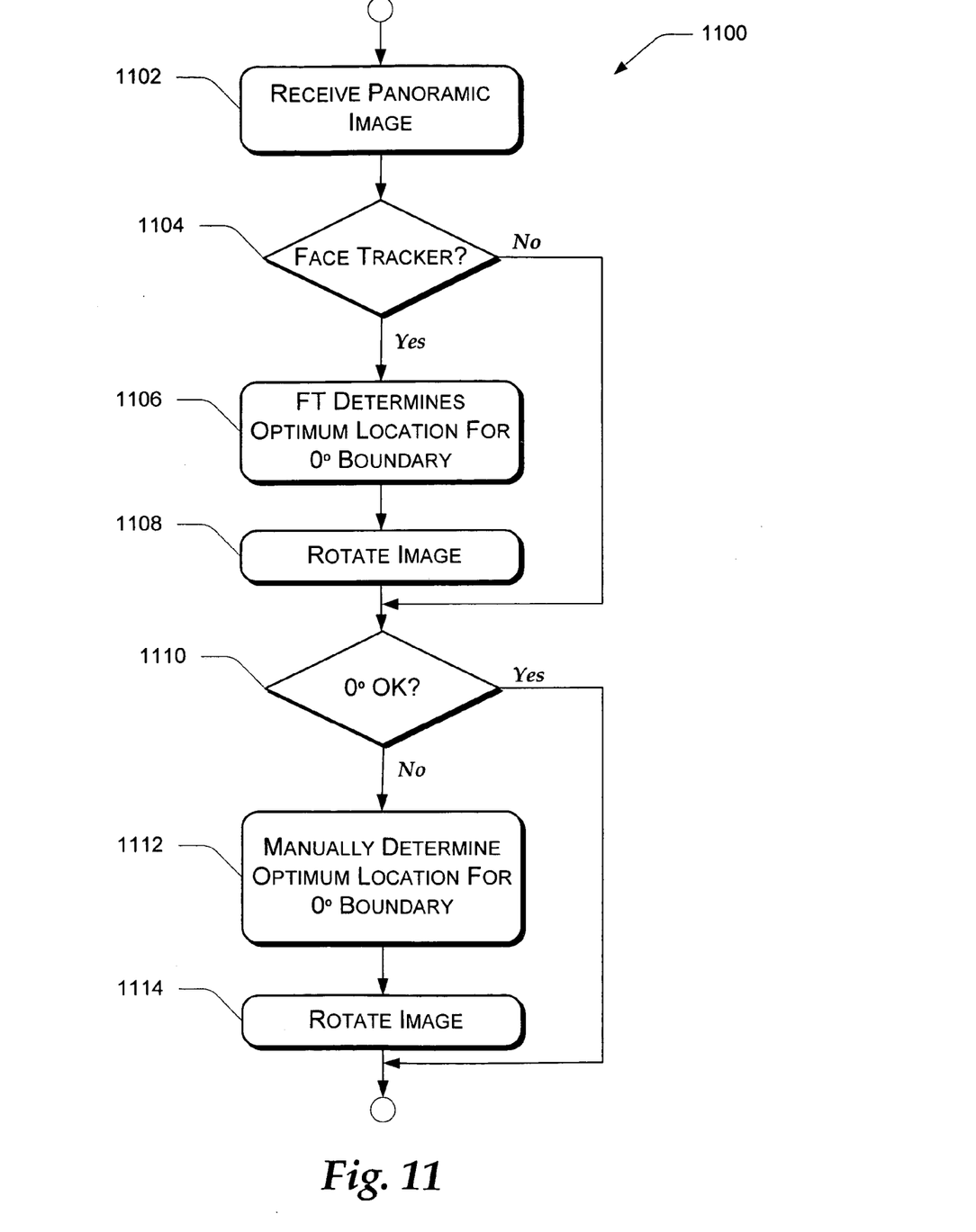
FIG. 11 is a flow diagram of an exemplary process on a client device for minimizing dead zones in a panoramic image.

FIG. 11 is a flow diagram 1100 depicting a process for minimizing dead zones in a panoramic image by rotating the panoramic image after the panoramic image has been created and stored. In the following discussion, continuing reference is made to elements and reference numerals shown in previous figures. The process depicted by the flow diagram 1100 refers to the block diagram shown in FIG. 8, previously described. Although a specific exemplary methodological implementation is shown in a specific order, it is noted that more or less steps may be performed to implement the described functionality and that the steps may be performed in an order other than that shown in the present example.

At block 1102, the stored panoramic image 838 is received by the client device 800. The panoramic image 838 may be received from the panoramic camera 700 in real time or it may be retrieved from the memory 828 at some time after it has been stored. At this point, a nominal zero degree boundary 848 has been set in order to render the panoramic image in a two-dimensional format. However, the nominal zero degree boundary 848 may not be in an ideal location for any of several reasons.

If a face tracker is available ("Yes" branch, block 1104), then the face tracker 840 scans the panoramic image 838 to locate faces in the panoramic image 838 (block 1106). If a better location for the zero degree boundary is located, then the boundary module 846 identifies the location, the new boundary is set and the rotation module 844 rotates the panoramic image 838 accordingly at block 1108. If a user accepts the rotated image ("Yes" branch, block 1110), then the process terminates.

If no face tracker is available ("No" branch, block 1104) or if a user does not like the new location of the zero degree boundary ("No" branch, block 1110), then the user manually resets the zero degree boundary at block 1112 as described above. When the user resets the boundary, the panoramic image 838 is rotated accordingly (block 1114) and the process terminates.

Thereafter, the user may alter the zero degree boundary as desired. For example, if a new participant joins the meeting and happens to sit in the dead zone, the user may wish to adjust the boundary so as to capture a complete image of the new participant.

CONCLUSION

While one or more exemplary implementations have been illustrated and described, it will be appreciated that various changes can be made therein without departing from the spirit and scope of the claims appended hereto.

The invention claimed is:

1. A camera system comprising:
one or more cameras configured to produce an image of a wide area up to three hundred and sixty degrees (360.degree.);
means for determining a location of a zero degree boundary, where a two-dimensional image of the wide area produced by the camera system is divided by automatically determining a portion of the wide area in which no subject is located for the location of the zero degree boundary;
a remapping module configured to remap pixels from the camera image onto a panoramic space according to the zero degree boundary; and
wherein a panoramic image rendered from the panoramic space has a left margin and a right margin corresponding to the zero degree boundary.

2. The camera system as recited in claim 1, wherein the means for determining a location of a zero degree boundary further comprises a face tracker.

3. The camera system as recited in claim 1, wherein one or more of the non-camera elements are included in a client device.

4. The camera system as recited in claim 1, wherein the wide area further comprises a span of at least three hundred and sixty degrees (360.degree.).

5. The camera system as recited in claim 1, wherein the remapping module is further configured to duplicate a portion of the image taken by the camera so that the portion is included in the panoramic space two times.

6. A method, comprising:
receiving a panoramic image;
determining a location of a zero degree boundary with respect to the panoramic image; and
transforming the panoramic image with respect to the zero degree boundary to minimize a dead zone associated with the zero degree boundary to create a modified panoramic image.

7. The method as recited in claim 6, wherein the receiving step further comprises receiving the panoramic image in a video stream from a panoramic camera.

8. The method as recited in claim 6, wherein the receiving step further comprises receiving the panoramic image from an image storage location.

9. The method as recited in claim 6, wherein the determining step further comprises setting a zero degree indicator to indicate a location that does not include an object to be imaged.

10. The method as recited in claim 6, wherein the determining step further comprises automatically detecting an optimum location for the zero degree boundary, said optimum location being a location that does not include an object to be imaged.

11. The method as recited in claim 6, wherein the determining step further comprises utilizing a face tracking mechanism to identify a location where no face is situated to be the location of the zero degree boundary.

12. The method as recited in claim 6, wherein the transforming step further comprises duplicating at least one portion of the panoramic area in the panoramic image, said portion of the panoramic area being an area adjacent to the zero degree boundary.

13. The method as recited in claim 11, further comprising resizing the panoramic image to a normalized panoramic space.

14. One or more storage media containing processor executable instructions that, when executed, perform the following steps:
determining a location of a zero degree boundary with respect to the panoramic area by determining a location in which no subjects are located in the panoramic area;
receiving one or more images of a panoramic area;
mapping the one or more images onto a panoramic image so that the zero degree boundary is represented by at least one margin of the panoramic image.

15. The one or more storage media as recited in claim 14, wherein the determining step further comprises receiving an indication of the location of the zero degree boundary.

16. The one or more storage media as recited in claim 14, further comprising duplicating a portion of an image of the panoramic area located adjacent to the zero degree boundary in the panoramic image.

17. The one or more storage media as recited in claim 14, wherein:

the receiving step further comprises receiving a first panoramic image; and the remapping step further comprises remapping the first panoramic image to a second panoramic image.

18. The one or more storage media as recited in claim 17, wherein the receiving step further comprises retrieving a stored panoramic image from memory.

* * * * *